No. 654,815. Patented July 31, 1900.
E. B. STOCKING.
MATCH MAKING MACHINE.
(Application filed May 17, 1900.)
(No Model.) 4 Sheets—Sheet 2.
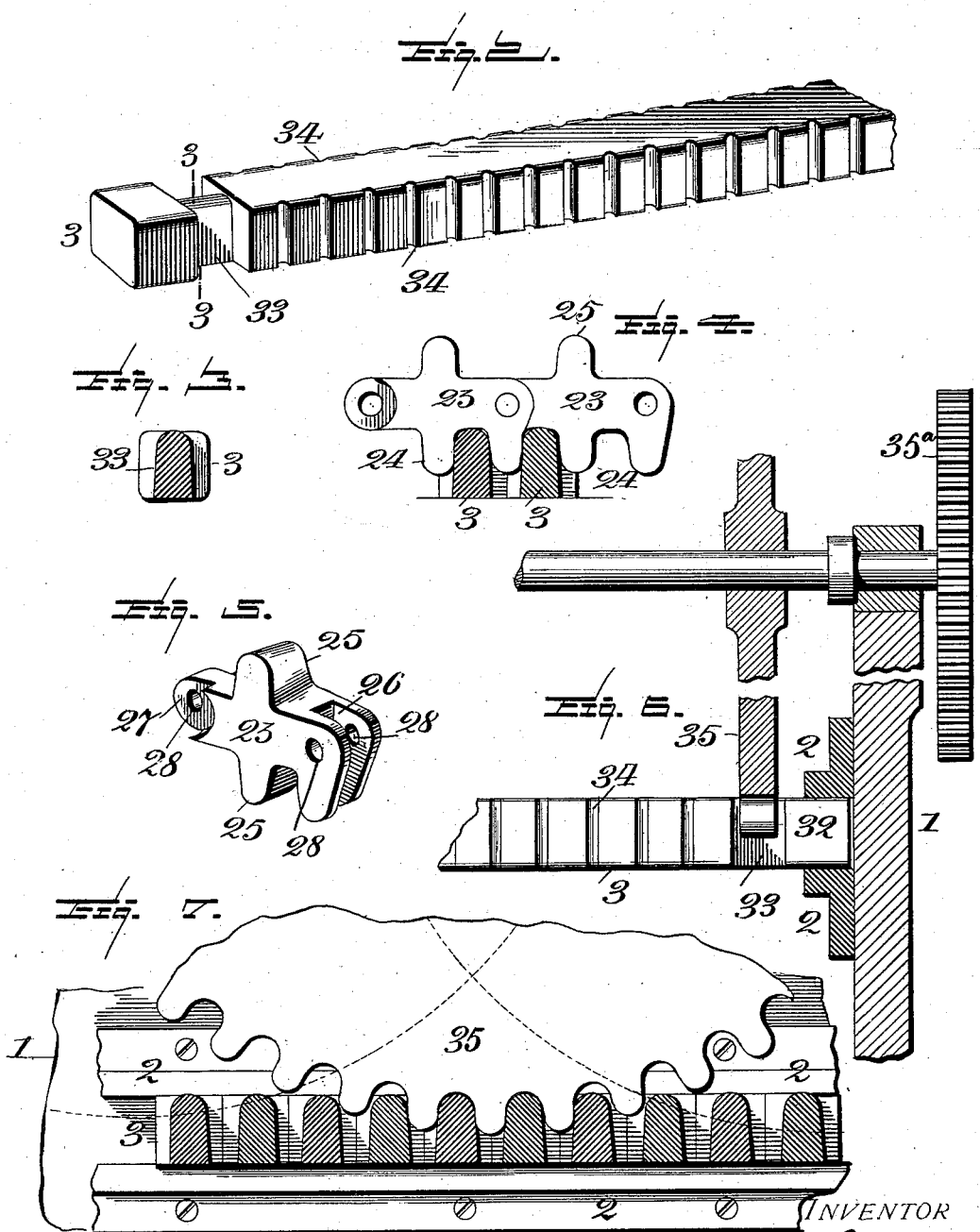

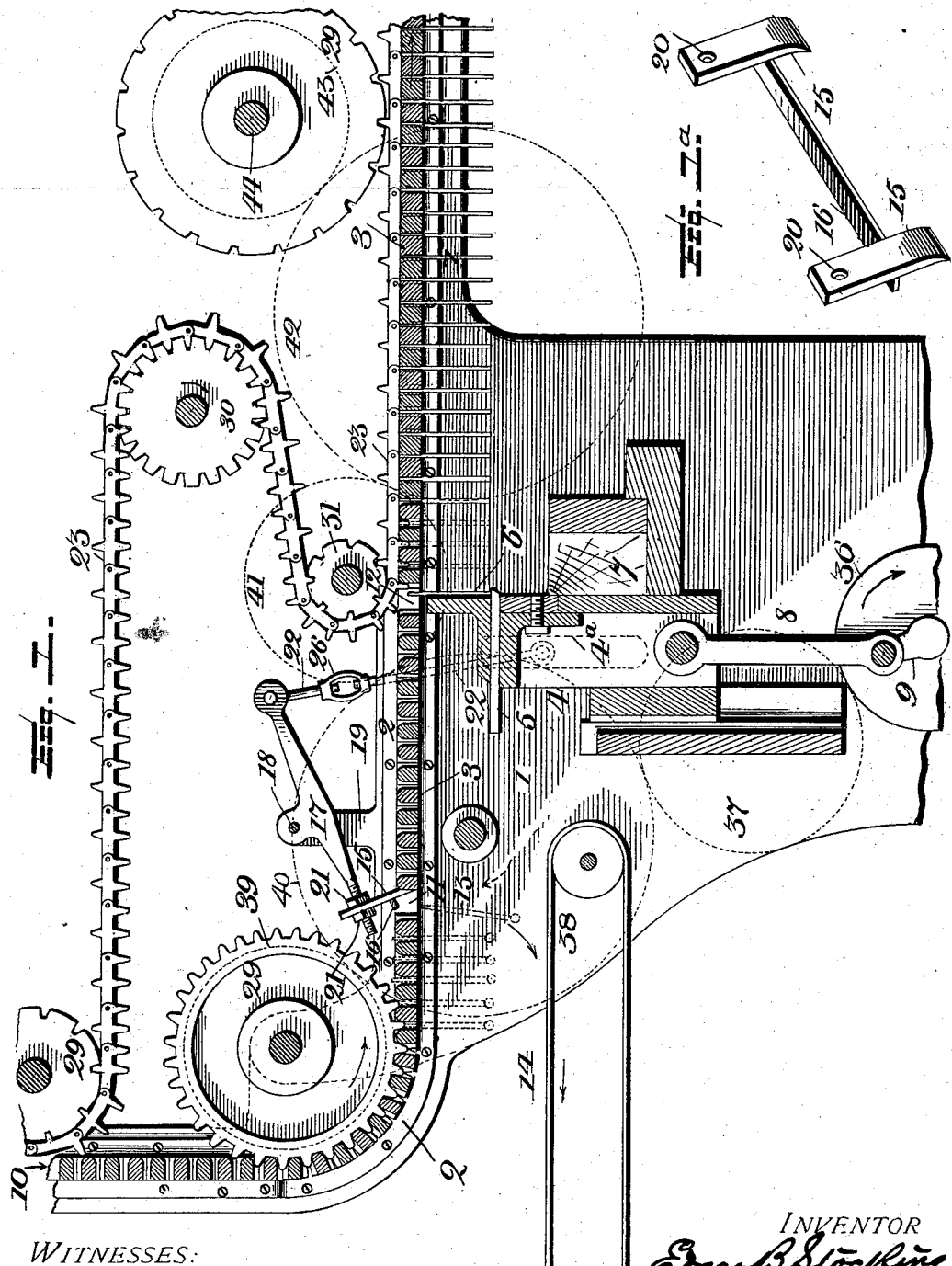

No. 654,815. Patented July 31, 1900.
E. B. STOCKING.
MATCH MAKING MACHINE.
(Application filed May 17, 1900.)
(No Model.) 4 Sheets—Sheet 3.
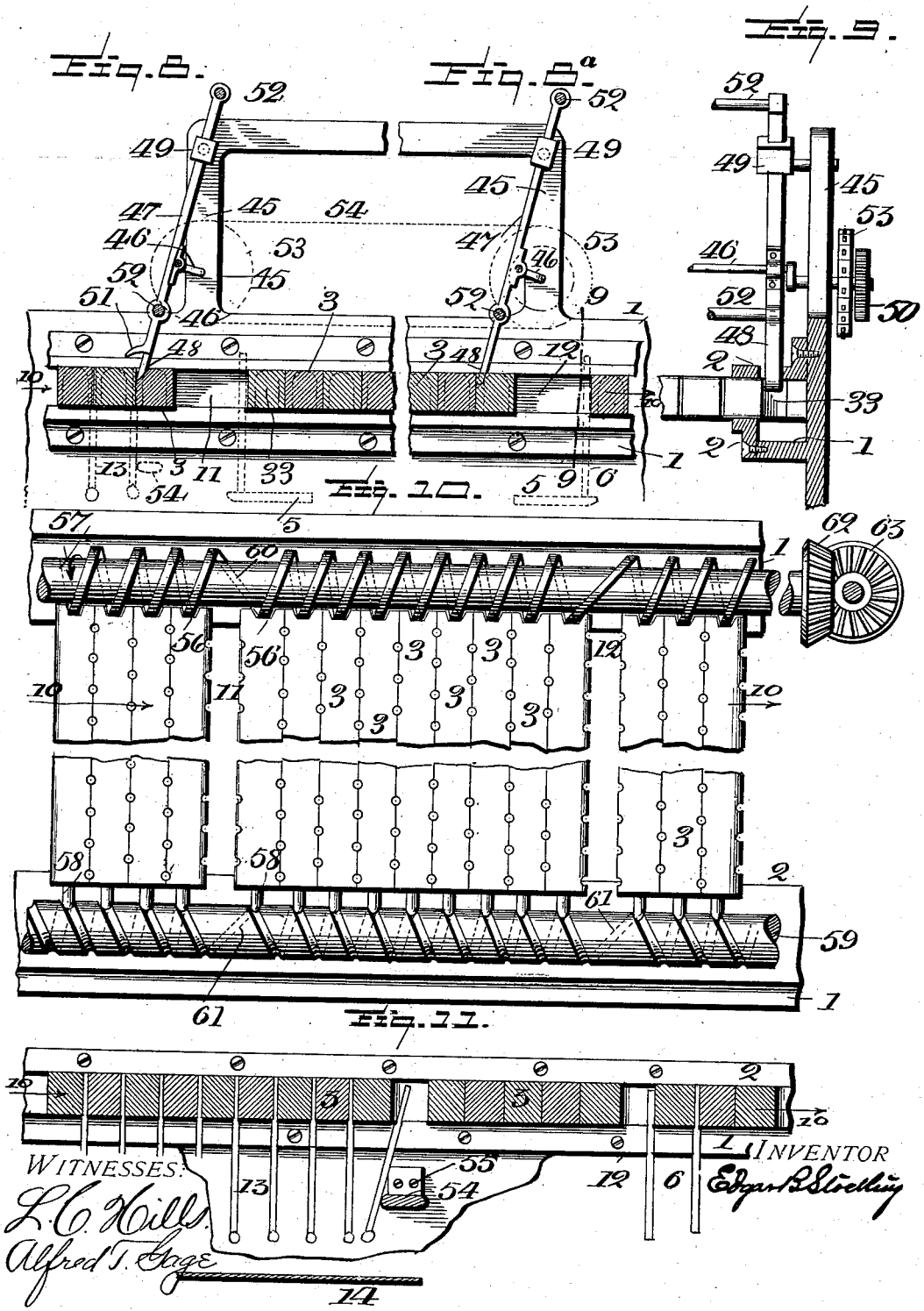

No. 654,815. Patented July 31, 1900.
E. B. STOCKING.
MATCH MAKING MACHINE.
(Application filed May 17, 1900.)
(No Model.) 4 Sheets—Sheet 4.
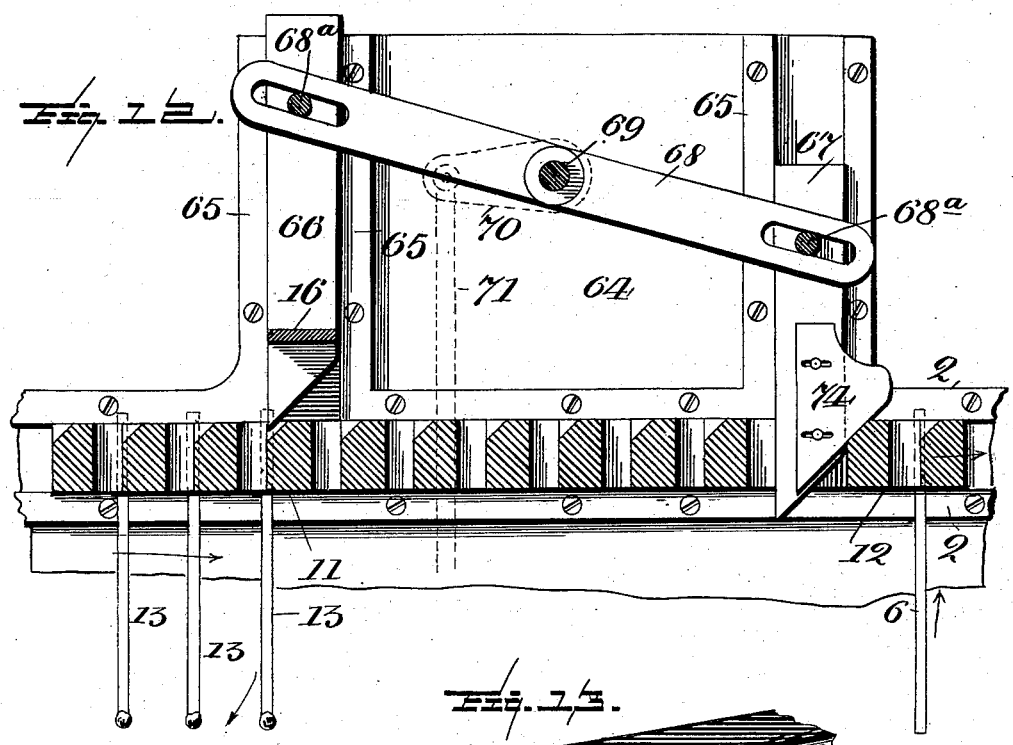
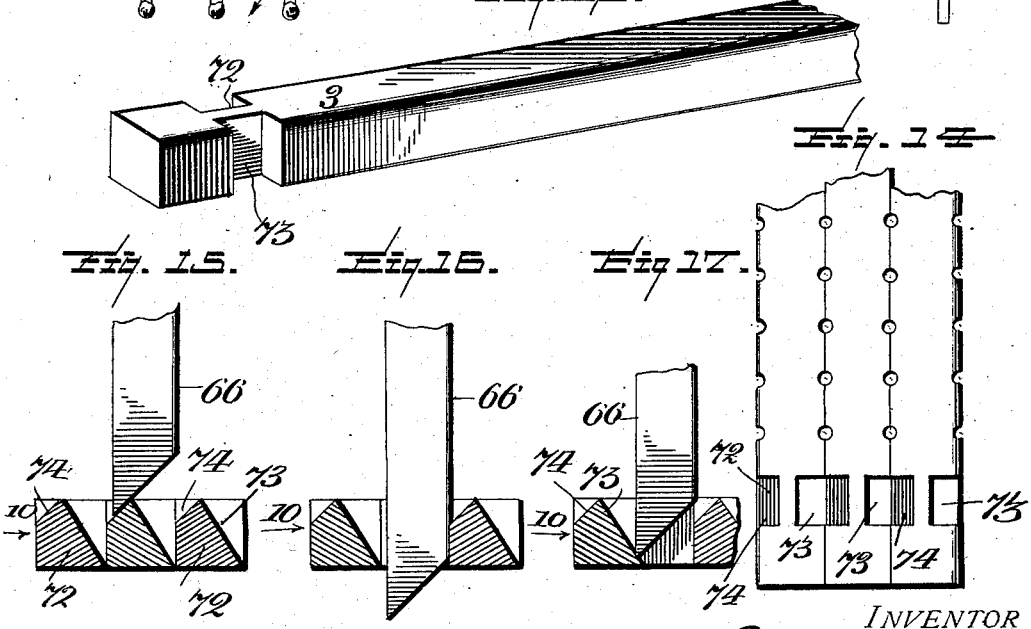
WITNESSES:
L. C. Hills.
Alfred T. Gage.
INVENTOR
Edgar B. Stocking

UNITED STATES PATENT OFFICE.

EDGAR B. STOCKING, OF WASHINGTON, DISTRICT OF COLUMBIA.

MATCH-MAKING MACHINE.

SPECIFICATION forming part of Letters Patent No. 654,815, dated July 31, 1900.

Application filed May 17, 1900. Serial No. 17,012. (No model.)

*To all whom it may concern:*

Be it known that I, EDGAR B. STOCKING, a citizen of the United States, residing at Washington, District of Columbia, have invented certain new and useful Improvements in Match-Making Machines, of which the following is a specification, reference being had therein to the accompanying drawings.

This invention relates to match-machines and to that class of machines in which a cutter-head severs from a block of wood a row of splints and inserts the same into a carrier adapted to receive and transport a continuous series of such rows of splints from the cutter-head to a paraffin-tank into which the splints are dipped, and from thence to a composition-tank, where they are again dipped into an igniting compound, and from thence through a suitable distance and for a time necessary to dry said composition (aided or not by the application of heat) to a point where the completed matches are discharged from the carrier, which finally thereafter arrives at the place of the insertion of fresh supplies of splints, the travel of the carrier being essentially in an endless path, and this either by a continuous or intermittent movement.

This invention relates particularly to that character of match-machines in which are employed a series of match-splint-clamping bars which are independent and separable from each other and from carriers, chains, or other means for transporting said bars in their endless path, whereby when separated from such carrying means adjacent bars may be separated from and moved into contact with each other for the purpose of discharging completed matches therefrom and for receiving and clamping match-splints between them.

Among the objects in view is the avoidance of what is known as a "curved" path, the sprockets with or without polygonal hubs, and the spring-fingers employed with a curved path through or in which the bars move, and the knockers to bring the bars into clamping relation at said curved path. All of these elements are dispensed with by my invention.

A further object is to provide a construction in which the discharging and the clamping functions may each be performed while the bars involved are in a single plane—that is, in a straight path—and another purpose is to accomplish the discharging and clamping functions by the most simple and at the same time most effective means, and this without interfering with the continuous movement of that portion of the series of bars which are working—that is, which are supplied with splints or completed matches and which are being carried in other portions of the endless path above described.

Other objects and advantages will be mentioned in the following description, and the novel features of the invention will be particularly pointed out in the claims.

Before proceeding to a detailed description of the mechanical construction involved in my invention it will aid a clear understanding of the same to state generally my method of arranging and controlling the bars whereby a space or spaces are formed between adjacent bars, splints introduced into and matches discharged from said space or spaces, and the bar at the introducing space brought into clamping relation with the next bar thereto. This work is accomplished by removing the extraneous carrier or bar-moving means from a desired number or series of bars constituting the idle bars and taking out a bar, or it may be bars, from such number or series from which the moving means has been removed, so as to form a space either solely at the discharging-point or solely above the cutter-head for receiving splints, and also taking out a bar or bars from such number or series to form a space at both the discharging and receiving points of the series. A suitable locality in the machine for this work is that which is known as the "head" of the machine, in which the cutter-head is located, and in case a single space only is employed for both receiving and discharging it is located above said cutter-head or in close proximity thereto.

When the receiving and discharging spaces are formed separately, by removing one or more bars the intermediate bars are utilized as a means for closing the receiving-space as a bar is moved to discharge matches at the discharging-space, or separate, similar, or dissimilar means may be employed for moving a bar at each space, to at one space deliver matches and at another space to receive splints. In all cases after bars are brought into clamping relation upon received splints they (the bars) are put under the control of the carrier or whatever bar-moving means is employed, by which they are caused to pass through the endless working-bar path of the machine. This passage is preferably continuous, although it may be intermittent, and in the former case the operations of the space forming and closing means are so timed that as a fresh bar arrives at the discharging-space a bar is moved into clamping relation at the receiving-space, and thus no interference with a continuous passage of bars in the endless path occurs. It is understood that a working bar is one in clamping relation with either splints or with completed matches, while an idle bar is one having at least one face not in contact with either splints or matches.

As the paraffin and composition tanks and dipping mechanism form no part of the invention they are neither shown nor described, and they can be of any well-known construction. It may therefore be understood that the left and right extremities of the coöperatively-arranged devices herein shown and described are continuations of the well-known endless working-bar path of a carrier, as hereinbefore described.

Referring to the drawings, Figure 1 is a substantially central vertical section of the head or splint-receiving and match-discharging portions of a match-machine provided with my invention. Fig. 1ª is a detail in perspective. Fig. 2 is a perspective of the main portion of one form of one of the match-splint-clamping bars which may be employed. Fig. 3 is a section on the line 3 3 of Fig. 2. Fig. 4 is a side elevation of two links of a chain or endless carrier in coöperative position on two of the bars shown in Figs. 2 and 3. Fig. 5 is a perspective of one of the links shown in Figs. 1 and 4. Fig. 6 is a vertical transverse section, extended, of Fig. 7. Fig. 7 is an elevation of a portion of the bar-guides and a bar-moving sprocket, with bars in section, drawn in full size. Fig. 8 is a modification of the invention. Fig. 8ª is a duplicate application of the said modification. Fig. 9 is an end elevation, partly in section, on line 9 9 of Fig. 8ª. Fig. 10 is another modification of the invention relating to the bar-moving and bar-spacing means. Fig. 11 is a modification of the match-discharging means. Fig. 12 is a still further modified form of bar-moving and bar-spacing means. Fig. 13 is a perspective of the match-clamping bar shown in Fig. 12. Fig. 14 is a plan of a series of said bars in clamping relation. Figs. 15, 16, and 17 are diagrammatic views of the relative coöperation of said bars and the moving and spacing device shown in Fig. 12.

Like characters of reference indicate like parts throughout the several figures of the drawings.

1 represents the frame of the head of a match-machine.

2 are the guides above and below the splint-receiving and match-clamping bars. These guides or their equivalents are, it is understood, extended throughout the endless path traveled by the working bars for applying paraffin and an igniting compound and for drying the same, as is usual.

In Fig. 1, 4 is a cutter-head having cutters 5, adapted to form splints 6 from a block of wood 7, the cutter-head being reciprocated by rod 8 and crank-shaft 9, all of well-known construction. The arrows 10 represent the direction of the travel of the bars 3 through the head of the machine. 11 represents the discharging-space, and 12 the receiving-space, formed by the removal of a bar at one or at each of said points in the series of bars that fill or would fill the distance from one of said spaces to the other, and this series comprises the idle bars of the entire series in the machine, in that they are unoccupied by either splints 6 or completed matches 13, and constitute a supply from which bars are successively moved into clamping relation and then transferred to the working bars of the machine. As the bars 3, bearing a row of completed matches, arrive at discharging-space 11 the forward bar of a pair having matches thereinbetween is quickly moved forward in the line of travel of the series, forming anew the discharging-space 11, when the row of matches fall upon a moving belt 14, which delivers them from the machine. Now the movement of the forward bar of the pair just mentioned carries with it all intervening idle bars (shown in Fig. 1 as extending to the splint-receiving space 12,) so that the foremost bar of said intervening bars (or in case space 11 is also the receiving-space, as it may be, (see Fig. 8,) the said forward bar of the pair) is brought into clamping relation with the next bar in front of it, so as to seize and carry the splints 6 brought up by the cutters 5. This movement of the idle bars may be accomplished by various means, which by reasons of the straightness of the path formed by the guides 2 2 may be exceedingly simple, accurate, and effective in operation. One form of such means consists of a bar-mover comprising arms 15, connected, it may be, by a cross-bar or by a match-contacting plate 16, to positively throw down the matches 13, which arms are each carried by a lever 17, pivoted at 18 in a standard 19 on frame 1. For adjusting the time of contact of arms 15 with the bars 3 the end of lever 17 is screw-threaded and passes through openings 20 in the arms, while nuts 21 serve to hold the arms in an adjusted position. The lever 17 is oscillated on its pivot by a connecting-rod 22, pivoted to the cross-head 4, its connection therewith passing through a slot 4ª in the frame 1. For determining the extent of the bar-moving action of the arms 15 a turnbuckle 26 or other equivalent adjustment of the length of the rod 22 is provided, as, within certain limits, the greater the length of rod 22 the farther arms 15 will move the idle bars, the limits in the construction described being sufficient to bring bars in clamping relation at the receiving-space into control of the working-bar-moving means. It will be seen that when properly timed the bar-movers 15 will begin to act just as the cutter-head is bringing up a row of splints and will complete their bar-moving function an instant before the cutter-head descends, leaving the splints clamped by bars. The momentary rest occurring when the crank 9 is on its upper dead-center facilitates the described operation.

Any desired means may be employed for moving the working bars through the usual endless path of the machine, and the bars may be so constructed at their ends to adapt them to any known form of bar-carrier so long as they are capable of independent separation from such carrier as may be employed.

In Figs. 1 to 5 I have shown a working-bar-moving means comprising a chain comprising links 23, each of which has two lower bar-moving teeth 24, an upper link-moving tooth 25, and an end slot 26, adapted to receive an end tenon 27 of a companion link, the slotted end and tenon being bored at 28 for the reception of rivets. This chain is adapted to be driven by oversprockets 29 and undersprockets 30, each adapted to mesh with the upper and lower teeth, respectively, of the links 23, and such sprockets are located at desired points in the machine, according to the endless path thereof, and to separate the chains (there being one chain at each end of the bars 3) from idle bars in the head of the machine. For this purpose, as shown in Fig. 1, the chain is deflected from the bars 3 by an oversprocket 29 to a pulley or undersprocket 30, and from thence to the working bars around the small oversprocket 31.

The bars adapted to the chain just described are constructed with substantially-square bearing-heads 32, Figs. 2 and 6, which ride between the guides 2 and a bar-driving neck 33 and splint-paralleling grooves 34. This form of bar gives great strength at the driving-points at each end, and the heads, with the corners removed, give a broad bearing and light friction in the guides.

In Figs. 6 and 7 a working-bar-moving means is shown in which a chain is dispensed with, and it comprises sprockets 35, adapted to mesh directly with the driving-necks 33 of the bars. These sprockets may be located at any desired points of the working path and may be arranged to overlap each other, (see dotted lines in Fig. 7,) in which case the driving-necks 33 would be somewhat longer. In this system the bars are pushed against each other by one sprocket until the next sprocket is reached, and the distance from sprocket to sprocket is determined by the amount of friction of the bar-heads in the guides, so that overlapping of the sprockets is not necessary. By gearing 35$^a$ these sprockets are driven from any desired moving part of the machine.

Referring again to Fig. 1, one system of gearing is shown to give motion to the working-bar-moving means, although my invention is not limited thereto, as this is a matter entirely within the skill of the machine-builder. Upon the main shaft, on which is crank 9, a gear 36, meshing with the intermediates 37 and 38, the latter meshing with gear 39 on the shaft 40 of sprocket 29 and with gear 41 on the shaft of sprocket 31, which latter gear meshes with an intermediate 42, which drives gear 43 on shaft 44 of the sprocket 29, all as indicated by dotted lines. In this manner or by sprocket-and-chain gearing any of the chain or bar driving sprockets may be positively driven.

In Fig. 8 I have shown a modified form of idle-bar-moving means. In this form two bars are removed to provide a single discharging and receiving space and the bar-moving means is given a travel sufficient to carry an idle-bar over a distance equal to three times the width of a single bar. In this form rotary movement is utilized, and a consequent smoothness of operation with less jar and friction is secured, which at the rapid rate required is a material advantage. The cutter 5 (shown in dotted lines) presents splints into the space 11 and bar 3 is moved directly into clamping relation thereon. In this form in standards 45 on the frame 1 and above the straight guides 2 2 is mounted a crank-shaft 46, extending from side to side of the machine. At each side there is arranged duplicate devices of those shown, whereby the bars 3 are moved by contact with each end thereof. It is obvious that a central driving-neck may also be formed on the bar and be utilized in moving the same. Upon the crank-shaft is mounted a lever 47, the lower end 48 of which is adapted to engage the driving-necks 33 of the bars 3. At a point above the crank connection of the lever it passes and reciprocates through a pivot-block 49, bearing in the standard 45. A gear 50, Fig. 9, on the crank-shaft 46, and suitable connections to a moving part of the machine serve to rotate the crank-shaft in proper time relative to the travel of the working bars through the machine, as described. A match-contacting cross-plate 51 may extend from the lever 47 to its companion on the opposite side of the machine, as do the connecting bars or rods 52, or the stationary bar 54, Fig. 11, may be used, in which case no contacting plate 51 is provided on levers 47.

As thus far described it will be seen that the end 48 of the lever 47 will describe an elongated oval path which in the direction of travel of the bars will be in contact with the driving-necks thereof and will move the front bar in clamping relation with completed matches, so as to deliver the same by gravity, or with plate 51 present will positively deliver the matches, and in the further movement of the end 48 of lever 47 will move the idle bar forward in line of travel, so as to bring it into clamping relation on a row of splints brought into the space 11. However, when separate discharging and receiving spaces are employed in the series of idle bars, in order to insure smoothness of action and to reduce friction of the bars in the straight path, I may duplicate the idle-bar-moving means, as seen in Fig. 8ª, connecting both bar-movers by a sprocket (53) and chain (54) gearing, no contact-plate 51 being present on the lever 47 at the receiving-space 12. In fact, no match-contacting plate is required in any of the forms of idle-bar movers herein shown, as the matches will drop by gravity, or such as adhere in the grooves of the bar will be positively removed in the advancement of the bar by a stationary match-contacting plate 54, Fig. 11, which touches the matches above their heads and (being secured at one or both of its ends by screws 55 to the frame 1) will obstruct the travel of the lower ends of the matches so that the moving upper ends will be separated from the bar.

In Fig. 10 the idle-bar-moving means is completely rotary in its nature, and consists of worm-gearing which continuously feeds the idle bars without intermittent motion or stoppage of any kind, and yet so times the movements of the idle bars as to permit the discharge of matches by the fixed plate 54, Fig. 10, or by other means and the insertion of splints at the respective spaces 11 and 12. The bars in this instance are provided with slots 56, adapted to coact with the spirally-ribbed shaft 57 or with pintles 58, adapted to coact with the spirally-grooved shaft 59. In each case the rib 60 and groove 61, adjacent to the spaces 11 and 12, while a part of and dependent upon the worm-shafts for motion, are given an increased pitch, so as to quickly move bars a distance twice their width at each revolution of the shafts, thus being *per se* bar-movers, while at remaining points the idle bars are moved continuously and without separation in a time agreeing with the movement of the working bars of the machine. This is accomplished by a proper connection of the miter-gear 62, one on each of the shafts 57 and 59, with miter-gears 63 for each of said gears 62 on vertical shafts properly connected to a desired rotating shaft of the machine in a manner well known to the skilled machine-builder.

In Fig. 12 I have shown a modification in which the removal of a single idle bar only, and that at the receiving-point, is necessary to provide discharging and receiving spaces in a series of idle bars and also a modification of the bar itself to adapt it to the particular bar-moving means shown. In this case the path of the bars 3 is straight, as before, the guides 2 and frame 1 being unchanged. From the frame there projects a broad standard 64, having gibs 65 thereon, in which are mounted for reciprocation (being in this instance, though not necessarily, in a vertical plane) space-forming and bar-moving slides 66 and 67. These slides are reciprocated by a lever 68, slotted at each end to receive pins or cross-rods 68ª, projecting from each of the slides, said lever being mounted on a rock-shaft 69. It is understood that the slides and lever are duplicated at the opposite side of the machine, so as to act at each end of each bar. A rock-arm 70 and connecting-rod 71, extending to the cutter-head, as in Fig. 1, or to any other desired properly-timed moving part of the machine, serve the purpose of giving a rocking motion to the shaft and to lever 68.

The bars 3 are each provided near each end with a driving-neck 72, having a clearance side 73, which may be either vertical (see Figs. 12, 13, and 14) or inclined (see Figs. 15, 16, and 17) in order to give time for the slides 66 67 to rise from their lowest position without obstructing the advancement of the idle bars in rear thereof, as will be apparent, as a bar can advance a distance equal to that from the front side of the bar to the clearance side or wall 73, while a slide 66 or 67 is rising between the bars. The opposite wall of the neck is inclined for a short distance, as at 74, to give an entrance to a slide 66 or 67 and to permit it to act upon a bar to move the same before it has wholly passed beneath the slide.

Referring to Fig. 15, it will be seen that the idle-bar-moving slide has descended into contact with the face 74 of the neck 72, and by the resistance of the gibs 65 will move the bar along until the slide reaches its lowest position. (Shown in Fig. 16.) As it ascends, the bar in rear is still moving forward, (see Fig. 17;) but the wall 73 being cut away to form a clearance, as before stated, either straight or inclined, permits such movement until and after the slide has reached its highest point. In the meantime the bars have been separated and the completed matches 13 have been delivered therefrom. While the slide 66 has been descending, as just described, the slide 67 has risen, the vertical or inclined wall 73 of the neck 72 permitting simultaneous advancement of the series of idle bars in rear of slide 67 until the forward bar thereof arrives at a point beneath slide 67, so that on the descending movement thereof it is forced into clamping relation with the splints 6 and the bar in front of them.

74, Fig. 12, is a cam-plate adjustably mounted on slide 67 as a means of moving bars in clamping relation after they have been moved into that relation by the slide 67 to form anew the receiving-space. This means may be also employed to insure the time of connection of working bars with a desired form of working-bar-moving means. A match-contacting plate 16 may, if desired, be employed in connection with slide 66.

It will be readily understood that other and various forms of idle-bar-moving devices may be employed without a departure from the general mode of operation hereinbefore described, and I therefore do not limit my invention to the exact details herein shown and described. The disposition of the bars at the point when completed matches are to be delivered therefrom and at the point when splints are to be presented thereto in paths which are straight produces advantages in simplification, cost of construction, and maintenance which are material, and the means disclosed for moving the bars separately or collectively to produce a discharging-space and the moving of the bars individually or collectively to form such space or to bring certain bars into clamping relation is such as is applicable to machines of the class specified, whether they embody an intermittent or a continuous movement of the working bars.

It is proper to state at this point that in the prior art shown by the particular character of machine to which, as herein shown and described, my invention is adapted the cleaner employed at the discharging-space and the knockers employed at the receiving-space each performed a feeding function upon the bar, limited, however, in extent to moving said bar a distance less than its width when it was seized and moved along by independent extraneous bar-moving means extending throughout the series of idle bars, except solely and for an extremely-limited distance at the receiving and discharging spaces. The said feeding function of the cleaner and knocker was intended solely to insure the entrance of the bars into the control of said independent and extraneous bar-moving means. By my invention such independent extraneous bar-moving means is dispensed with, as also is the necessity of a curved path at the receiving-space and all of the adjunctive construction and arrangement necessitated by said curved path, one necessity being a provision of accessibility of the knockers to an idle bar in order that they could force it into clamping relation and into the control of another independent extraneous working-bar-moving means. In my invention the idle-bar mover not only opens bars to discharge matches, but feeds the idle bar either by a single movement or by a succession of movements throughout its travel as an idle bar without employing bar-moving means independent of the bar-mover *per se*. In the modification in Fig. 10 the worms which feed the idle bars are not independent of the bar-movers *per se*—to wit, the increased pitch-threads 60 61—but are a part and parcel thereof. My invention therefore contemplates a bar-mover at a discharging or at a receiving space which not only separates bars to discharge matches, but which controls and feeds all of the idle bars without the use of independent bar-moving means at and along the idle-bar series.

What I claim is—

1. In a match-machine, a series of working splint-clamping bars, means for advancing the same, a series of idle, independent, match-splint-clamping bars arranged in a single plane, and a bar-moving means constructed and operating to form a space to discharge matches and to close a space to clamp splints; substantially as specified.

2. In a match-machine, a series of working splint-clamping bars, means for advancing the same, a series of idle independent match-splint-clamping bars arranged in a single plane, and a bar-moving means constructed and operating to simultaneously form a space to discharge matches and a space to clamp splints; substantially as specified.

3. In a match-machine, a series of independent working and idle match-splint-clamping bars arranged in a single plane with a splint-receiving space between two successive bars and a space following bars containing matches and bar-moving means for separating the working bars to deliver matches therefrom and for moving into clamping relation the bars at the receiving-space; substantially as specified.

4. In a match-machine, idle, independent match-splint-clamping bars arranged in a single plane, and a bar-moving means for forming splint-receiving and match-delivering spaces between adjacent bars; substantially as specified.

5. In a match-machine, a series of independent, idle match-splint-clamping bars arranged in a single plane and working bars, a space being provided between adjacent bars arranged in the same plane as the idle bars, a carrier for said working bars, and a bar-mover for the idle bars serving to release matches from and to clamp splints between working bars; substantially as specified.

6. In a match-machine having a splint-clamping-bar carrier, a chain comprising links, each having an upper link-moving tooth and lower bar-moving teeth and slotted at one end, in combination with sprockets adapted to mesh with opposite sides of said chain; substantially as specified.

7. In a match-machine, the combination of an endless carrier, a series of independent bars between which splints are to be held separably connected with said carrier, means for separating from and returning said bars to said carrier, means for guiding the separated bars in a single plane, and a bar-moving and space forming and closing means adapted to enter between bars which are separated from the carrier to discharge matches therefrom, to feed said separated bars, and to bring the bars into clamping relation with splints presented thereto, substantially as and for the purposes set forth.

8. In a match-machine, the combination of an endless carrier, a series of independent bars between which splints are to be held separably connected with said carrier, means for separating from and returning said bars to said carrier, means for guiding the separated bars in a single plane, and a bar-moving and space forming and closing means moving faster than the endless carrier adapted to enter between bars which are separated from the carrier to discharge matches therefrom, to feed said separated bars, and to bring the bars into clamping relation with splints presented thereto, substantially as and for the purposes set forth.

9. In a match-machine, a series of independent match-splint-clamping bars, a lever for moving the same, and means driven by a rotary shaft for driving the lower end of said lever in a substantially-oval path; substantially as specified.

10. In a match-machine, a series of independent match-splint-clamping bars, a lever for moving the same, means driven by a rotary shaft for driving the lower end of said lever in a substantially-oval path, and a sliding bearing for the upper portion of said lever; substantially as specified.

11. In a match-machine, a series of independent match-splint-clamping bars, a bar-moving lever arranged above the same, a rotary shaft provided with a crank-arm journaled in said bar, a pivoted bearing at the upper end of said bar through which the bar reciprocates, and means for driving said shaft and crank-arm; substantially as specified.

12. In a match-machine, a series of independent match-splint-clamping bars, a bar-moving lever arranged above the same, a rotary shaft provided with a crank-arm journaled in said bar, a pivoted bearing at the upper end of said bar through which the bar reciprocates, means for driving said shaft and crank-arm, and driving-necks upon said bars with which the lower ends of said levers are adapted to engage in their contacting movement; substantially as specified.

In testimony whereof I affix my signature in presence of two witnesses.

EDGAR B. STOCKING.

Witnesses:
ALFRED T. GAGE,
WM. D. SHOEMAKER.